(12) United States Patent
Weber

(10) Patent No.: US 9,944,234 B2
(45) Date of Patent: Apr. 17, 2018

(54) INDIVIDUAL PORTABLE CANOE LOADER

(71) Applicant: Frederick J Weber, Sheboygan, WI (US)

(72) Inventor: Frederick J Weber, Sheboygan, WI (US)

(73) Assignee: Myka LLC, Sheboygan, WI (US)

(*) Notice: Subject to any disclaimer, the term of this patent is extended or adjusted under 35 U.S.C. 154(b) by 0 days.

(21) Appl. No.: 15/048,905

(22) Filed: Feb. 19, 2016

(65) Prior Publication Data

US 2016/0243995 A1 Aug. 25, 2016

Related U.S. Application Data

(60) Provisional application No. 62/176,476, filed on Feb. 20, 2015.

(51) Int. Cl.
  *B60P 9/00* (2006.01)
  *B60R 9/06* (2006.01)
  *B60R 9/08* (2006.01)
  *B60P 1/44* (2006.01)
  *B60P 3/10* (2006.01)

(52) U.S. Cl.
  CPC .............. *B60R 9/06* (2013.01); *B60P 1/4407* (2013.01); *B60P 3/1008* (2013.01); *B60P 3/1016* (2013.01); *B60P 3/1025* (2013.01); *B60R 9/08* (2013.01)

(58) Field of Classification Search
  CPC .... B60P 3/40; B60P 3/10; B60P 3/077; B60P 1/43; B60P 1/435; B60P 1/4407; B60P 3/1008; B60P 3/1016; B60P 3/1025; B60P 3/1066; B62C 1/06; A61G 3/0209; B60R 9/00; B60R 9/06; B60R 9/08; B60R 9/042; B60R 9/0423; B60R 9/0426; B60R 2011/0084; B60R 2011/0092; B62B 5/0003
  USPC ......... 414/462–466; 224/403, 405, 310, 506, 224/521; 296/26.08, 26.11; 280/414.1
  See application file for complete search history.

(56) References Cited

U.S. PATENT DOCUMENTS

| 4,630,990 | A | * | 12/1986 | Whiting | B60R 9/042 224/310 |
| 5,529,231 | A | * | 6/1996 | Burgess | B60R 9/10 224/282 |
| 5,567,107 | A | * | 10/1996 | Bruno | B60R 9/06 241/200 |
| 5,615,813 | A | * | 4/1997 | Ouellette | B60P 3/40 224/405 |

(Continued)

FOREIGN PATENT DOCUMENTS

AU 2012100198 * 3/2012 ............ B60P 3/10

*Primary Examiner* — Jeffrey A Shapiro
(74) *Attorney, Agent, or Firm* — Ziolkowski Patent Solutions Group, SC

(57) ABSTRACT

A removable apparatus being configured for mounting to a hitch behind a vehicle which enables an individual to load and unload a canoe atop a vehicle. The apparatus includes a base which is adapted to rotate 360-degrees perpendicular of horizontal of the vehicle and includes a tube which is adapted to lock upright or pivot downwardly 30-degrees away from vertical of the vehicle. The apparatus includes a mechanism to position a receiving device configured to mate to a device mounted to the canoe.

20 Claims, 7 Drawing Sheets

(56) References Cited

U.S. PATENT DOCUMENTS

| | | | | |
|---|---|---|---|---|
| 5,678,743 A * | 10/1997 | Johnson | B60P 3/40 | 224/405 |
| 5,730,345 A * | 3/1998 | Yeckley | B60R 9/10 | 224/505 |
| 5,752,636 A * | 5/1998 | Manley | B60R 9/06 | 224/403 |
| 6,149,039 A * | 11/2000 | Englander | B60R 9/042 | 224/310 |
| 6,401,999 B1 * | 6/2002 | Hehr | B60R 9/06 | 224/502 |
| 7,044,699 B1 * | 5/2006 | St. Denis | B60P 7/15 | 410/34 |
| 7,111,765 B1 * | 9/2006 | Blakley | B60R 9/06 | 224/506 |
| 8,480,149 B2 * | 7/2013 | Durand | B60R 9/06 | 296/26.08 |
| 9,102,286 B1 * | 8/2015 | Deming | B60R 11/06 | |
| 9,156,392 B2 * | 10/2015 | Whiteford | B62C 1/06 | |
| 2002/0050502 A1 * | 5/2002 | Jeong | B60R 9/06 | 224/506 |
| 2008/0112784 A1 * | 5/2008 | Rogers | H01L 21/67775 | 414/411 |
| 2011/0024472 A1 * | 2/2011 | Thompson | B60R 9/042 | 224/500 |
| 2011/0024473 A1 * | 2/2011 | Weiss | B60R 9/06 | 224/500 |
| 2013/0240586 A1 * | 9/2013 | Liu | B60R 9/10 | 224/485 |
| 2013/0264367 A1 * | 10/2013 | Hill | B60R 9/06 | 224/413 |
| 2016/0179127 A1 * | 6/2016 | Smith | G05G 5/065 | 74/527 |

* cited by examiner

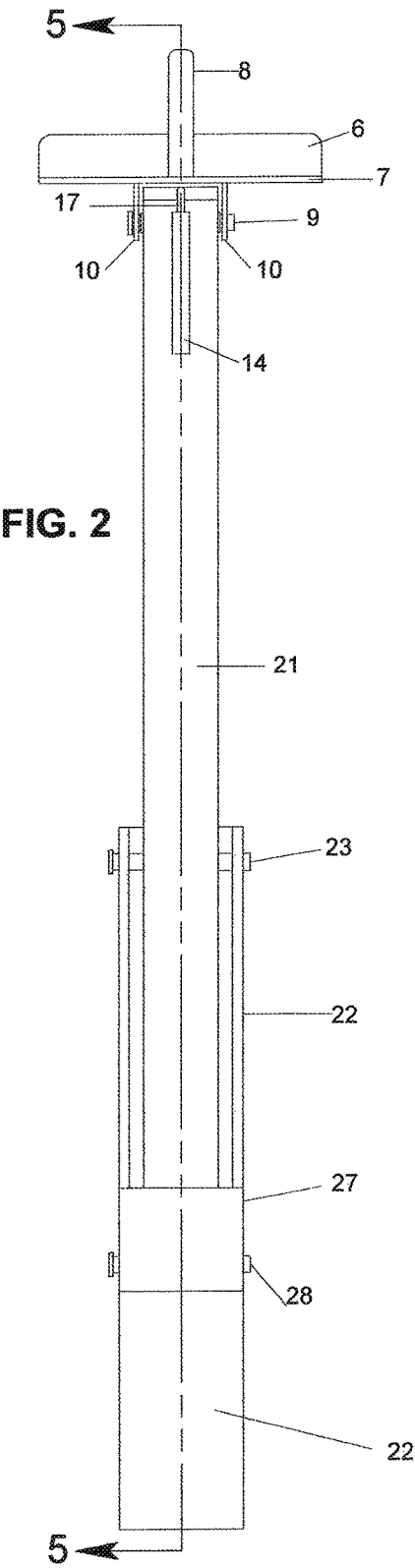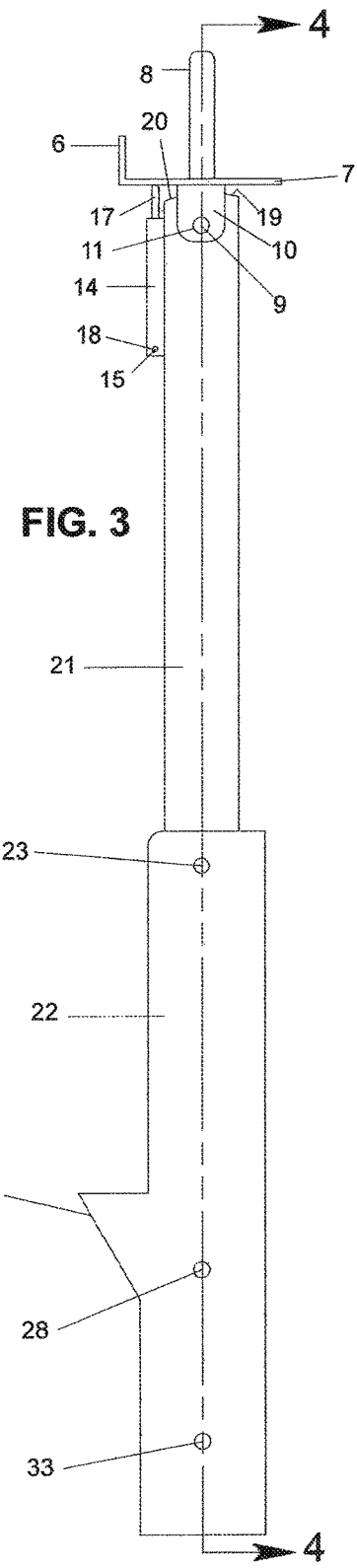

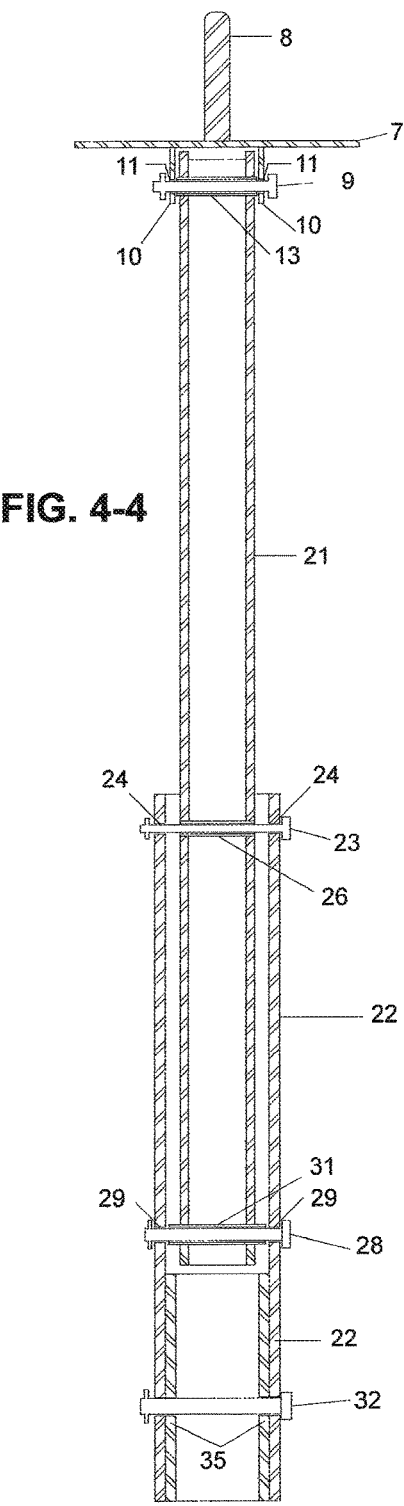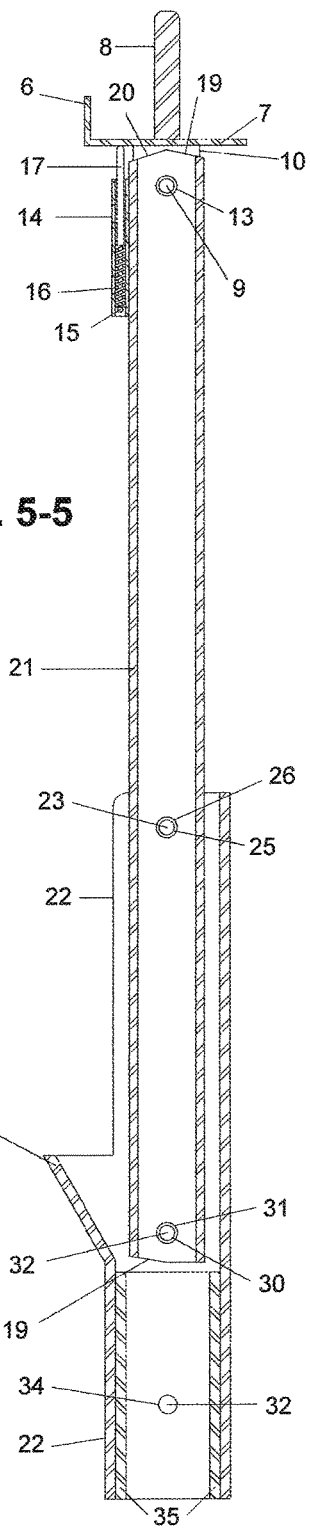

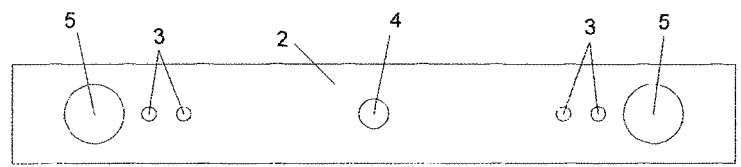
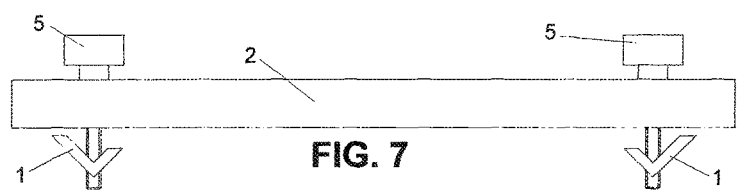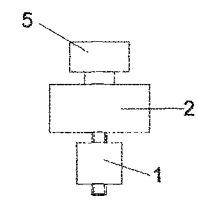
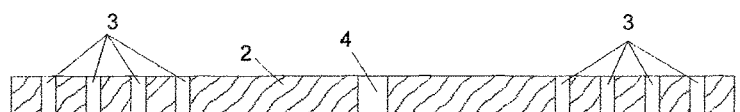
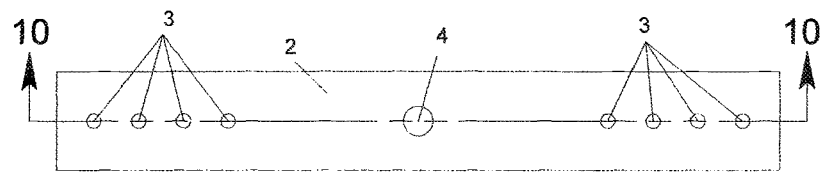
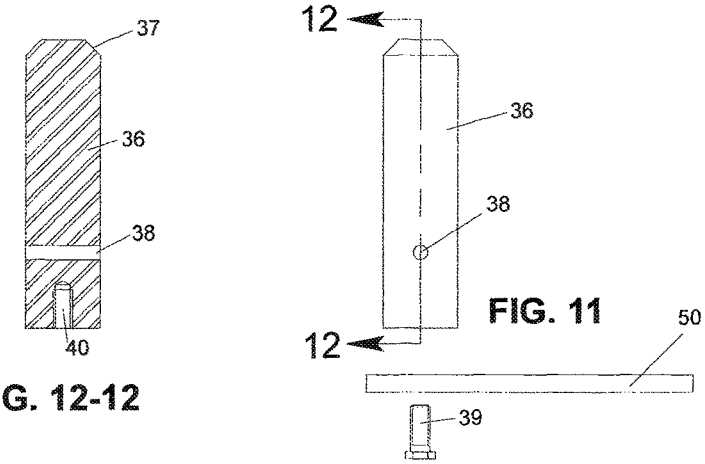

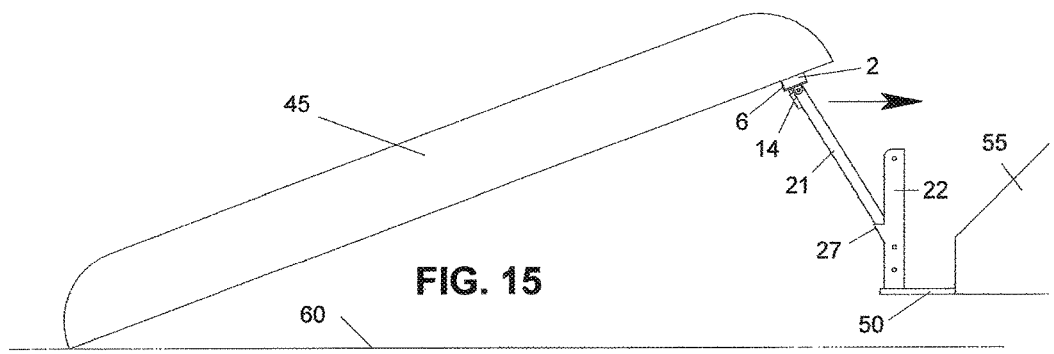
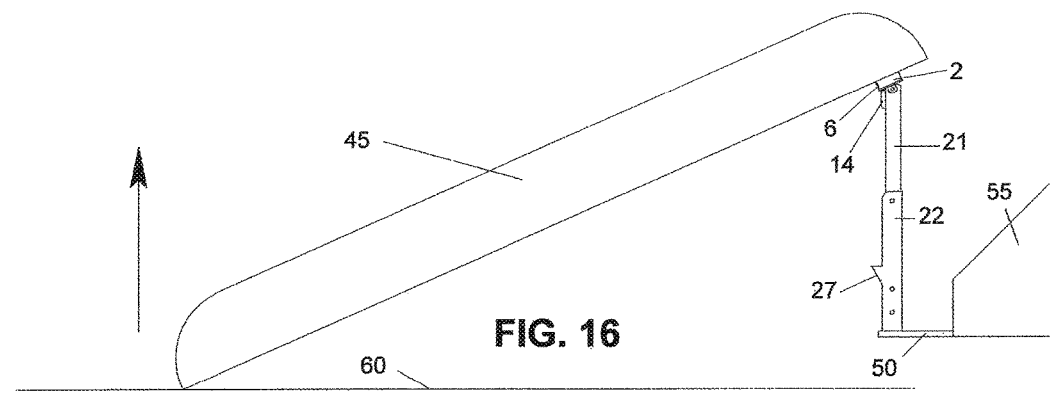
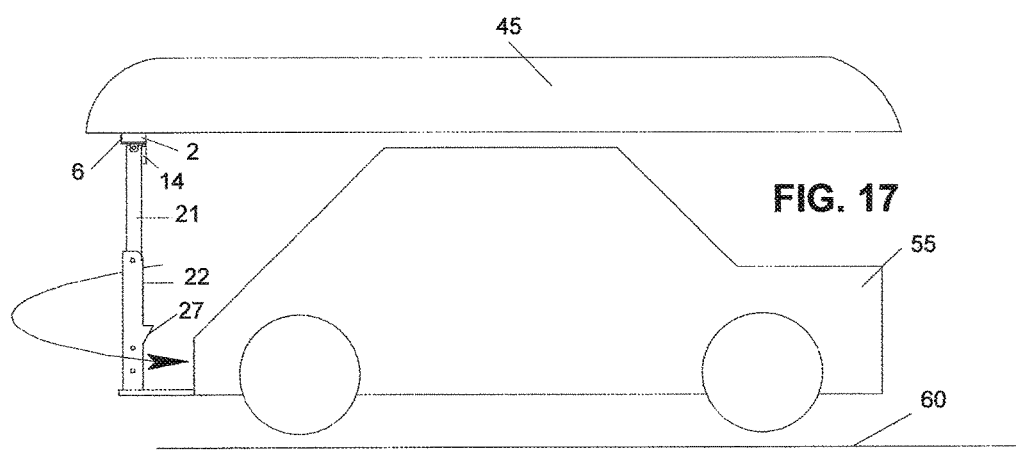

INDIVIDUAL PORTABLE CANOE LOADER

CROSS-REFERENCE TO RELATED APPLICATIONS

This application claims benefit from U.S. Provisional Patent Application No. 62/176,476, entitled "Individual Canoe Loader" filed on Feb. 20, 2015, which is hereby incorporated in its entirety by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention is in the technical field of sporting goods. More particularly the field of canoe loading devices, more particularly portable canoe loading devices, more particularly individual portable canoe loading devices.

Conventional canoe loading devices to assist in loading a canoe to the roof of a vehicle for transport exist as a series of pulley's and cables attached to an overhead support such as a garage ceiling, or a semi-rigid pipe with a roller atop mounted to a trailer hitch tongue. Using these devices typically requires an assistant, which is not always available, are cumbersome to use and a garage ceiling is not portable.

BRIEF SUMMARY OF THE PRESENT INVENTION

The present invention is a canoe loading device that is uncomplicated, portable and safe, but more importantly, enables a single individual of average build and strength, to load and unload a canoe to a vehicles roof for transport.

BRIEF DESCRIPTION OF THE SEVERAL VIEWS OF DRAWINGS

Figure 1:
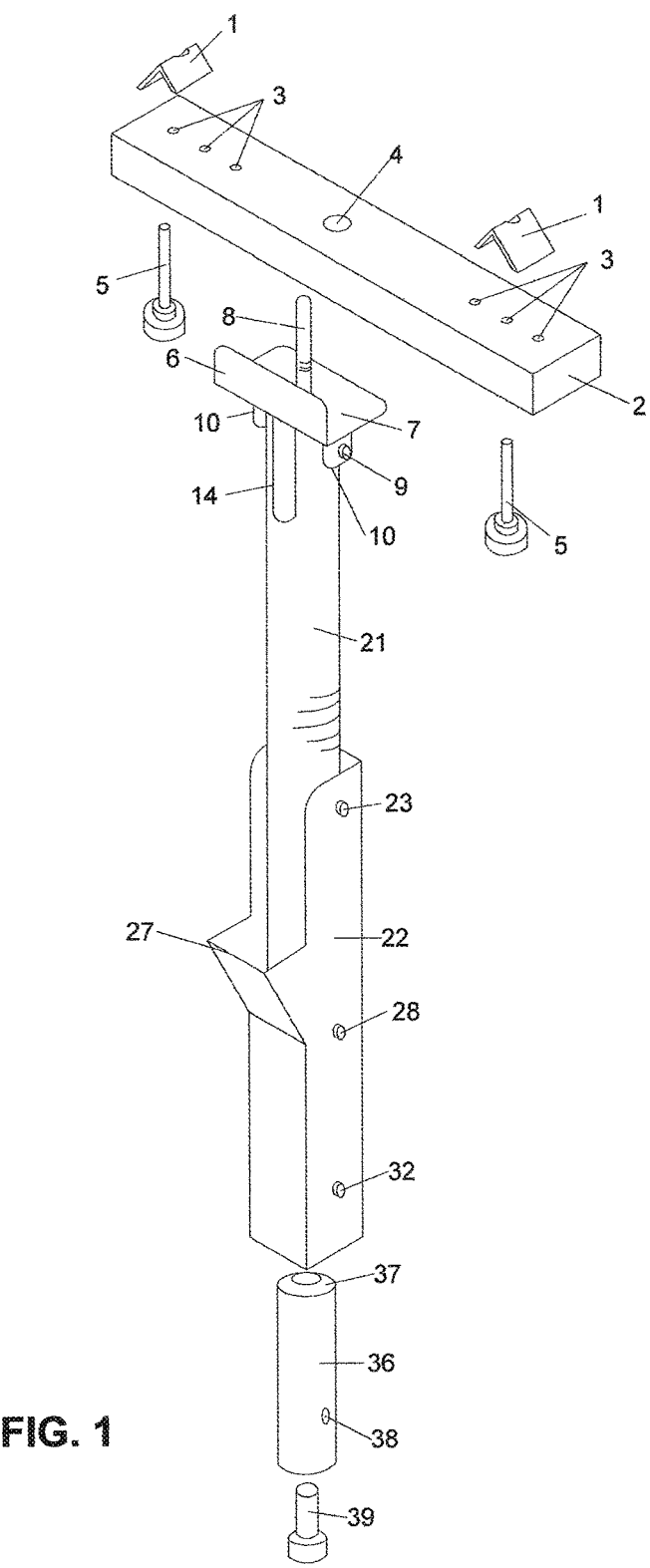
Figure 13:
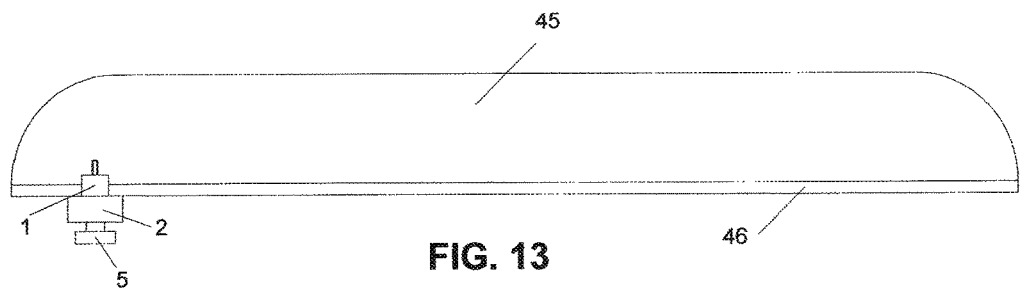
Figure 14:
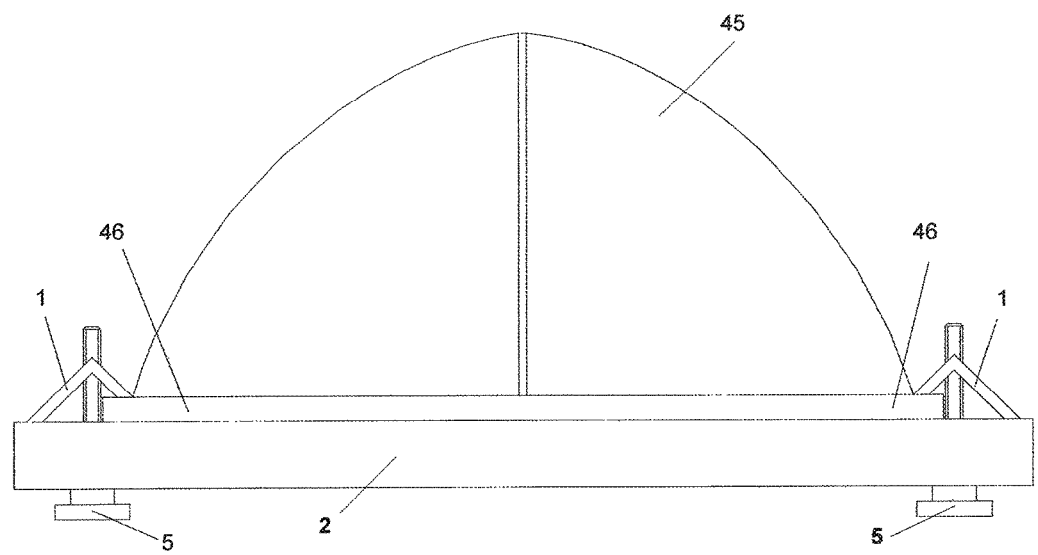
Figure 15A:
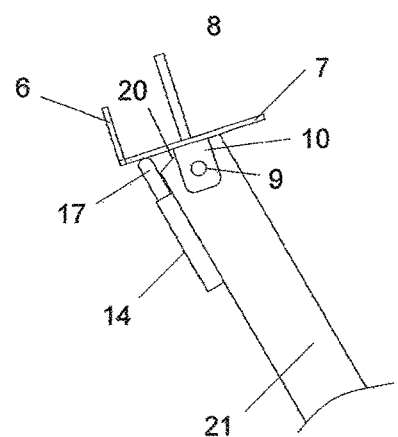
Figure 16A:
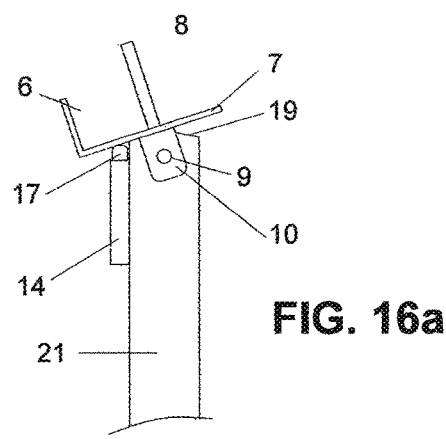
Figure 17A:
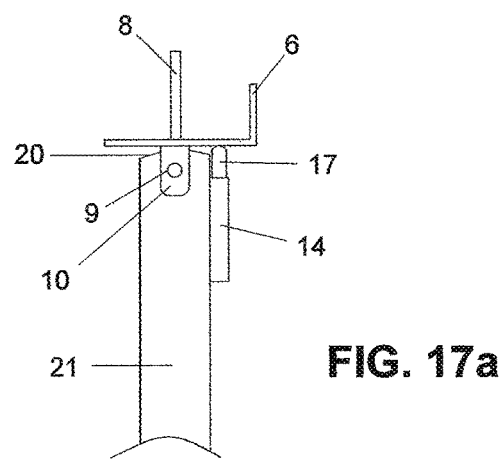

FIG. 1 is a drawing rendering the entire device.
FIG. 2 is a complete frontal view of the base, the main tube, the cradle and shows the cutting and sight line for FIG. 5-5.
FIG. 3 is a complete right side view of the base, the main tube, the cradle and shows the cutting and sight line for FIG. 4-4.
FIG. 4-4 is a sectional view of FIG. 2.
FIG. 5-5 is a sectional view of FIG. 3.
FIG. 6 is a top view of the canoe mount.
FIG. 7 is a side view of the canoe mount.
FIG. 8 is a end view of the canoe mount.
FIG. 9 is a top view of the canoe mount and shows the cutting and sight line for FIG. 10-10.
FIG. 10-10 is a sectional view of FIG. 9.
FIG. 11 is a view of the hitch mount components and shows the cutting and sight line for FIG. 12-12.
FIG. 12-12 is a sectional view of FIG. 11.
FIG. 13 is a side view showing canoe mount on canoe.
FIG. 14 is a frontal view showing canoe mount on canoe.
FIG. 15 is a view rendering showing the first phase of the process.
FIG. 16 is a view rendering showing the second phase of the process.
FIG. 17 is a view rendering showing the rotation and third phase of the process.
FIG. 15a is a partial view showing the cradle angular stop as in FIG. 15.
FIG. 16a is a partial view showing the cradle angular stop as in FIG. 16.
FIG. 17a is a partial view showing the cradle placement as in FIG. 17.

| REFERENCE NUMBERS IN THE DRAWINGS | | | |
|---|---|---|---|
| 1 | Angle pinch clamp | 7 | Cradle |
| 2 | Canoe mount | 8 | Guide pin |
| 3 | Mount holes | 9 | Cradle pivot pin |
| 4 | Guide hole | 10 | Cradle lug |
| 5 | Lobe knob with threaded shaft | 11 | Cradle lug hole |
| 6 | Cradle back plate | 12 | Tube insert |
| 13 | Tube hole | 30 | Tube insert |
| 14 | Plunger tube | 31 | Tube hole |
| 15 | Pin | 32 | Base rotational lock pin |
| 16 | Spring | 33 | Rotational lock pin hole |
| 17 | Plunger | 34 | Sleeve hole |
| 18 | Hole for pin | 35 | Sleeve |
| 19 | 12° angle | 36 | Hitch mount |
| 20 | 18° angle | 37 | Bevel |
| 21 | Tube | 38 | Hitch mount lock hole |
| 22 | Base | 39 | Hitch mount bolt |
| 23 | Tube lock pin | 40 | Threaded hole |
| 24 | Tube locking pin hole | 45 | Canoe |
| 25 | Tube insert | 46 | Canoe gunwale |
| 26 | Tube hole | 50 | Hitch tongue |
| 27 | 30° angular stop | 55 | Vehicle |
| 28 | Tube pivot pin | 60 | Surface |
| 29 | Pivot hole in base | | |

DETAILED DESCRIPTION OF THE INVENTION

Referring now to the invention in more detail, in FIG. 1, FIG. 11, and FIG. 12-12, there is shown the hitch mount 36. This hitch mount 36 is securely fastened to the existing trailer hitch tongue 50 with hitch mount bolt 39 threaded into hole 40. A bevel 37 facilitates in mounting the base 22.

Referring to the invention of FIG. 1, FIG. 2, FIG. 3, FIG. 4-4, FIG. 5-5, FIG. 15, FIG. 16, and FIG. 17, there is shown the base 22.

Referring to the invention of FIG. 3, FIG. 4-4, FIG. 5-5 there is shown the base 22 includes sleeve 35. Also the base 22 includes base pivot hole 29, rotational locking hole 33, sleeve hole 34 and tube locking pin hole 24 and the base 22 vertical angular stop 27.

Referring to the invention of FIG. 1, FIG. 2, FIG. 3, FIG. 4-4, FIG. 5-5, FIG. 15, FIG. 16 and FIG. 17, there is shown the tube 21.

Referring to the invention of FIG. 3, FIG. 5-5, FIG. 15a, FIG. 16a, it is shown the top of tube 21 has a twelve-degree angle 19 and eighteen-degree angle 20.

Referring to the invention of FIG. 5-5, it is shown the bottom of tube 21 has a 12-degree angle 19. It is shown tube 21 has three thru holes, the tube hole 13, tube hole 26, and tube hole 31 and three tube insert 12, tube insert 25, and tube insert 30.

Referring to the invention of FIG. 1, FIG. 2, FIG. 3, FIG. 5-5, FIG. 15, FIG. 16, FIG. 17, FIG. 15a, FIG. 16a, and FIG. 17a it is shown that the plunger tube 14 is attached to the top end of tube 21.

Referring to the invention of FIG. 3 and FIG. 5-5 it is shown that pin 15 is inserted into pin hole 18 of the plunger tube 14.

Referring to the invention of FIG. 5-5 it is shown the spring 16 is inserted into the plunger tube 14.

Referring to the invention of FIG. 2, FIG. 3, FIG. 5-5, FIG. 15a, FIG. 16a, FIG. 17a it is shown the plunger 17 is inserted into plunger tube 14.

Referring to the invention of FIG. 1, FIG. 2, FIG. 3, FIG. 4-4, FIG. 5-5, FIG. 15, FIG. 16, FIG. 17, FIG. 15a, FIG. 16a, FIG. 17a it is shown the round guide pin 8 and the cradle back plate 6 are attached to the cradle 7.

Referring to the invention of FIG. 1, FIG. 2, FIG. 3, FIG. 4-4, FIG. 5-5, FIG. 15, FIG. 16, FIG. 17 it is shown that the cradle lugs 10 are attached to the cradle 7.

Referring to the invention of FIG. 3 and FIG. 4-4 it is shown that the cradle lug 10 has a cradle lug hole 11.

Referring to the invention of FIG. 1, FIG. 2, FIG. 3, FIG. 4-4, FIG. 5-5, FIG. 15, FIG. 16, FIG. 17 it is shown that tube pivot pin 28 joins the tube 21 with the base 22. It is shown that tube lock pin 23 locks the tube 21 vertical in the base 22. It is shown that cradle pivot pin 9 joins the cradle 7 to the tube 21.

Referring to the invention of FIG. 1, FIG. 6, FIG. 9, FIG. 10-10, FIG. 13, FIG. 14, FIG. 15, FIG. 16, FIG. 17 it is shown that the canoe mount 2, has a number of equally spaced mount holes 3 used for attachment. Also shown is that the canoe mount 2 has a larger guide hole 4.

Referring to the invention of FIG. 1, FIG. 6, FIG. 7, FIG. 8, FIG. 13, and FIG. 14 it is shown that the mounting lobe knobs with shaft 5, and angle pinch clamps 1 are incorporated with the canoe mount 2.

In further detail, still referring to the invention in FIG. 1, FIG. 2, FIG. 3, FIG. 4-4, FIG. 5-5, FIG. 15, FIG. 16, FIG. 17 it is shown that with the hitch mount 36 is secured to the hitch tongue 50 with hitch mount bolt 39 with hitch mount lock hole 38 parallel to rear of vehicle. The base 22 is then lowered over the hitch mount 36. It is shown that the base can be locked from rotation by placing base rotational lock pin 32 through sleeve rotation lock hole 33, sleeve hole 34 and through hitch mount lock hole 38 in hitch mount 36. It is shown that when tube 21 is joined with the base 22 through tube hole 26 and tube insert 30 with tube pivot pin 28. This permits the tube 21, to pivot forward until it hits 30-degree angular stop 27. It shows that placing the tube in the vertical position, it can then be locked in place through tube locking pin hole 24 and tube insert 25 with tube lock pin 23.

Still referring to the invention in further detail in FIG. 5-5 it is shown that the spring 16 is inserted into the plunger tube 14 resting against pin 15. It is shown that plunger 17 is inserted into the plunger tube 14 and rests atop spring 16.

Referring to the invention in further detail in FIG. 1, FIG. 2, FIG. 3, FIG. 4-4, FIG. 5-5, FIG. 15, FIG. 16, FIG. 17, FIG. 15a, FIG. 16a, FIG. 17a it is shown that the cradle 7 is mounted to the top of tube 21 slightly compressing the plunger 17 and is held in place with cradle pivot pin 9 through cradle lug hole 11 and tube hole 13. This allows the cradle 7 to pivot from the twelve degree stop 19 from vertical center to the eighteen degree stop 20 from vertical center. At rest the spring 16 pushes the plunger 17 against the cradle 7, holding cradle 7 tight against twelve-degree angle stop 19. It also shows the cradle back plate 6 which rises at a 90-degree right angle from the cradle 7. It shows this cradle back plate 6 aligns the canoe mount 2 with the cradle 7 and holds the canoe mount 2 ridged.

In further detail referring to the invention in FIG. 9, FIG. 10-10, FIG. 13 and FIG. 14 it shows the canoe mount 2 fastened in the center across either the bow or stern of a canoe 45.

It shows that it is draw tight by placing the angular pinch clamps 1 over the canoe gunwale 46 and the lobe knob with threaded shafts 5 are threaded on and tightened. This places the guide hole 4 in the center.

Referring to the invention of FIG. 15, FIG. 16, FIG. 17, it is shown that the vehicle 55 has on its existing trailer hitch tongue 50, the base 22, tube 21 and cradle 7. It shows the canoe mount 2 securely attached to the canoe 45.

In further detail of FIG. 1, FIG. 15, FIG. 15a, FIG. 16, FIG. 16a, FIG. 17, FIG. 17a it shows that with the base 22 on the vehicle 55 and the tube 21 in the 30 degree position, the plunger 17 holding the cradle 7 against the 12 degree stop 19 and pin 32 in place to lock rotation. The individual then lifts the canoe 45 on the one end with the canoe mount 2 and places the guide hole 4 over the guide pin 8 then lowering it until it rests into the cradle 7 and is supported by the cradle back plate 6. The individual then pushes the tube 21 into the vertical position, locking it in place with tube lock pin 23. It shows the cradle 7 pivoting back towards the eighteen degree stop 20, compressing the plunger 16. Base rotation lock pin 32 is then removed allowing the base to rotate. The individual then simply lifts the opposite end off the surface 60 and walks it around the vehicle 55 and sets it down atop vehicle 55. Base rotational lock pin 32 is inserted locking base 22 rotation. The canoe 45 would then be safely strapped to the vehicle. Reverse procedure to unload.

The construction details of the invention as shown in FIG. 1, FIG. 4-4, FIG. 5-5, FIG. 9, FIG. 10-10, FIG. 11, FIG. 12-12 is shown as the canoe mount 2 as wood and approx. 30 inches in length. The rest of the entire unit as steel due to the needed rigidity. The base 22 being 26 inches in length with the tube 21 at 28 inches, but is sized depending on vehicle height. The sleeve 34 is tack welded into the base. The plunger tube 14 is welded in place to the tube 21. The three tube inserts 12, 30 and 35 are tack welded into position. The cradle lugs 10 and the guide pin 8 are welded in position to the cradle 7.

The primary advantage of the present invention, without limitation, is it offers the opportunity for a single individual of average size and build to safely load or unload a full sized canoe. It is completely portable, rigid, and simple to use. Further, it will work on cars, trucks or vans and can be stored easily within a trunk of a vehicle.

While the foregoing written description of the invention enables one of ordinary skill to make and use what is considered presently to be the best thereof, those of ordinary skill will understand and appreciate the existence of variations, combinations, and equivalents of the specific embodiment, method, and examples, but by all embodiments and methods within the scope and spirit of the invention as claimed.

I claim:

1. A portable individual canoe loader comprising:
   a hitch mount having a proximal end portion and a distal end portion, the distal end portion being configured for connection to a vehicle hitch;
   a first mast structure having lower and upper end portions comprising apertures configured to receive a pin, the lower end portion configured to surround the hitch mount, the first mast structure being movable about a central axis of the hitch mount;
   a second mast structure having a lower end portion and an upper end portion comprising apertures configured to receive a pin, the lower end portion being pivotally connected to the first mast structure allowing the second mast structure to move within an angular range of travel defined between a vertical use position and a pivoted position wherein the second mast structure rests against a fixed stop extending outward from a surface of the first mast structure and formed integral therewith;

a receiving structure pivotally connected to the upper end portion of the second mast structure, the receiving structure being movable between a vertical use position and an angled position; and a canoe mounting structure freely mated to the receiving structure;

wherein the receiving structure is configured to pivot to conform with angular movement of the canoe mounting structure.

2. The loader of claim 1 wherein the angular range of travel is 30-degrees.

3. The loader of claim 1 further comprising a spring device near the upper end portion of the second mast structure, the spring device moveable between a compressed position, wherein the receiving structure pivots toward the spring device, and an extended position, wherein the receiving structure pivots away from the spring device.

4. The loader of claim 3 wherein the receiving structure rests against a first angled surface of the second mast structure when the spring device is in the compressed position; and wherein the receiving structure rests against a second angled surface of the second mast structure when the spring device is in the extended position.

5. The loader of claim 3 wherein the spring device comprises:
a plunger tube coupled to the second mast structure;
a spring disposed within the plunger tube; and
a plunger disposed positioned atop the spring in the plunger tube.

6. The loader of claim 1 wherein the second mast structure comprises:
three sidewalls that span a length of the second mast structure; and
a fourth sidewall that is shorter than the three sidewalls; wherein the stop extends outward from the fourth sidewall.

7. The loader of claim 6 wherein the stop comprises a lip that extends upward and outward from the fourth sidewall.

8. The loader of claim 1 wherein the receiving structure comprises a cradle plate, a back plate joined to the cradle plate, and a guide pin extending upward from the cradle plate.

9. The loader of claim 8 wherein the canoe mounting structure comprises a guide hole sized to receive the guide pin of the receiving structure.

10. The loader of claim 1 further comprising:
a first pin that pivotably couples the first mast structure to the second mast structure; and
a second pin that extends through the first mast structure and the second mast structure to lock the second mast structure in a vertical position.

11. The loader of claim 10 further comprising a third pin that extends through the first mast structure and the hitch mount to prevent rotation of the first mast structure relative to the hitch mount.

12. The loader of claim 1 wherein the proximal end portion of the hitch mount comprises a beveled surface.

13. The loader of claim 1 wherein a portion of the lower end portion of the second mast structure is angled away from the hitch mount.

14. The loader of claim 1 wherein the second mast structure comprises a cylindrical tube.

15. The loader of claim 1 wherein the hitch mount comprises a cylindrical structure having a threaded opening formed in the distal end portion thereof.

16. A loading device comprising:
a hitch mount comprising a distal end portion configured for connection to a vehicle hitch;
a first mast structure configured to surround the hitch mount and rotate about a central axis thereof, the first mast structure comprising a stop extending outward from a surface of the first mast structure and formed integral therewith;
a second mast structure comprising a lower end pivotally connected to the first mast structure, the second mast structure movable between a vertical use position and a pivoted position wherein the second mast structure rests against the stop;
a receiving structure positioned adjacent an upper end of the second mast structure and pivotally connected thereto, the receiving structure movable between a vertical use position and an angled position; and
a plurality of pins configured to extend though aligned apertures in the hitch mount, the first mast structure, and the second mast structure to couple the first mast structure to the hitch mount and to the second mast structure.

17. The loading device of claim 16 further comprising a mounting structure freely mated to the receiving structure, wherein the mounting structure comprises a guide hole sized to receive a guide pin of the receiving structure.

18. The loading device of claim 17 wherein the mounting structure comprises:
a canoe mount; and
a pair of clamping devices extending through mounting holes in the canoe mount to facilitate attachment of a canoe to the loading device.

19. The loading device of claim 16 further comprising a spring device coupled to an upper end of the second mast structure, the spring device moveable between a compressed position, wherein the receiving structure pivots toward the spring device, and an extended position, wherein the receiving structure pivots away from the spring device.

20. The loading device of claim 16 wherein the second mast structure comprises:
three sidewalls that span a length of the second mast structure; and
a fourth sidewall that is shorter than the three sidewalls; wherein the stop comprises a lip that extends upward and outward from fourth sidewall.

* * * * *